United States Patent
Van Toever

(12) 
(10) Patent No.: US 6,617,155 B1
(45) Date of Patent: *Sep. 9, 2003

(54) FLUIDIZED RADIAL FLOW BIOREACTOR UTILIZING PELLET MEDIA

(76) Inventor: J. Wayne Van Toever, 401 Tim Warren Rd., Bristol, TN (US) 37620

(*) Notice: Subject to any disclaimer, the term of this patent is extended or adjusted under 35 U.S.C. 154(b) by 0 days.

This patent is subject to a terminal disclaimer.

(21) Appl. No.: 09/786,886
(22) PCT Filed: Sep. 10, 1999
(86) PCT No.: PCT/CA99/00829
§ 371 (c)(1),
(2), (4) Date: May 25, 2001
(87) PCT Pub. No.: WO00/15565
PCT Pub. Date: Mar. 23, 2000

(51) Int. Cl.⁷ .............................................. C12M 1/12
(52) U.S. Cl. ........................ 435/297.1; 435/297.2; 435/299.1; 210/196; 210/286; 422/216; 422/218
(58) Field of Search .................... 422/139, 140, 422/211, 216, 218; 435/286.5, 297.1, 297.2, 299.1; 210/167, 196, 282, 286

(56) References Cited

U.S. PATENT DOCUMENTS

| | | | | |
|---|---|---|---|---|
| 4,028,244 A | * | 6/1977 | Holmberg | 210/150 |
| 4,546,083 A | * | 10/1985 | Meyers et al. | 435/293.2 |
| 5,055,186 A | * | 10/1991 | Van Toever | 210/150 |
| 5,413,749 A | * | 5/1995 | Geiser | 264/293 |
| 5,593,574 A | | 1/1997 | Van Toever | 210/150 |
| 6,326,191 B2 | * | 12/2001 | Van Toever | 210/167 |

FOREIGN PATENT DOCUMENTS

| | | | | |
|---|---|---|---|---|
| DE | 3818776 A1 | * | 12/1989 | B01D/13/00 |
| WO | WO 87/05593 | * | 9/1987 | |
| WO | WO 98/09919 | * | 3/1998 | |

* cited by examiner

*Primary Examiner*—David A. Redding
(74) *Attorney, Agent, or Firm*—Simpson & Simpson, PLLC

(57) ABSTRACT

Disclosed is a bioreactor apparatus having a bed of buoyant media pellets floating within a filtrate to be processed. The apparatus includes a tank (22) having a peripheral wall for containing filtrate (34) and a bed (36) of media pellets (38). A central manifold (100) is rotatably supported within the tank, the central manifold being mounted for rotation about a vertical axis (22) and having a plurality of longitudinally spaced openings (140) intermediate its ends, the openings adapted to eject filtrate in a generally horizontal direction and along a substantially vertical plane toward the wall of the tank, cyclically fluidize pellets in a directly narrow zone. In a preferred aspect, there is also a thrust manifold (140), generally parallel to the axis of the central manifold and having a plurality of longitudinally spaced openings intermediate its ends directed horizontally and generally perpendicularly to the plane. The thrust manifold (150) is supported in association with the central manifold (100) inwardly adjacent the tank wall and offset rearwardly of the plane to rotate with the central manifold. Filtrate is fed to the central manifold (100) and the thrust manifold (150), whereby the of filtrate ejected by the central manifold fluidizes a vertical zone of pellet media around and in front of the thrust manifold (150) and rotation of the central manifold and thrust manifold is caused by filtrate ejected from the openings in the thrust manifold. The invention also comprehends specially designed pellet media for optimum performance. The manifolds may be structured for retrofitting in existing bioreactors.

16 Claims, 6 Drawing Sheets

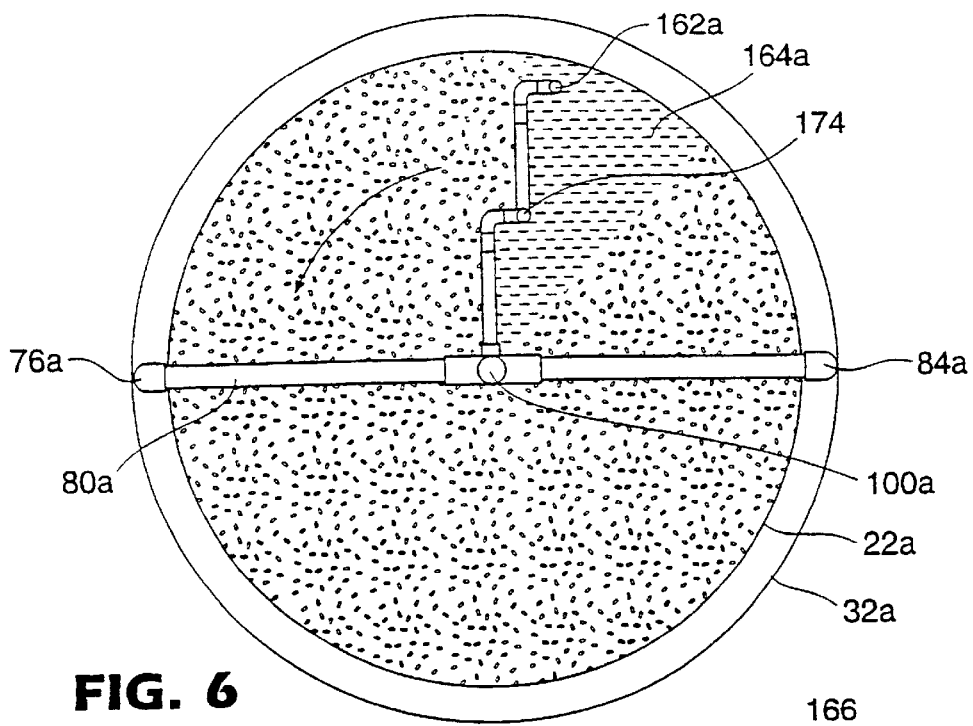
FIG. 6
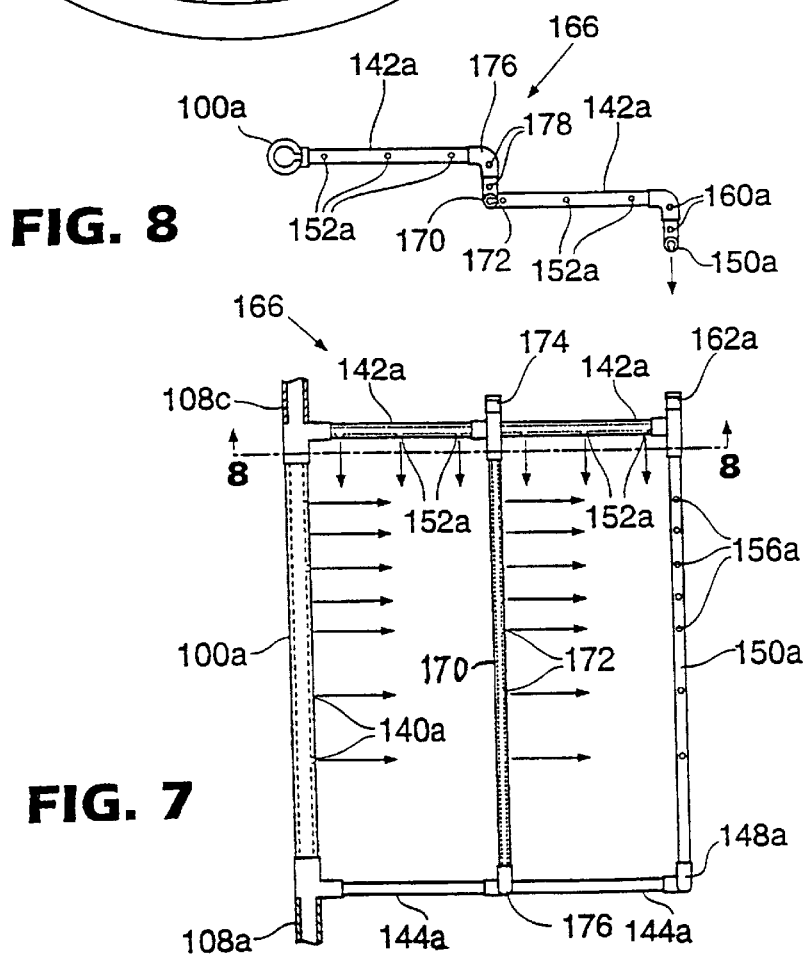
FIG. 8
FIG. 7

FLUIDIZED RADIAL FLOW BIOREACTOR UTILIZING PELLET MEDIA

FIELD OF INVENTION

The invention relates to bioreactors used to culture a wide variety of microorganisms and organisms such as algae, for various purposes from filtering dissolved wastes in water, digesting organic wastes, to producing pharmaceutical end-products.

BACKGROUND OF THE INVENTION

U.S. Pat. Nos. 5,055,186 and 5,593,574 granted Oct. 8, 1991 and Jan. 14, 1997, respectively, to Van Toever, relate to bioreactor systems, primarily biofilter systems, using fluidized pellet media. Although such systems are effective, efforts to scale up the systems have encountered some difficulties, particularly when the objective is to provide a bioreactor system having maximum possible effective surface area for cultural bacteria and other microorganisms to provide a system which is self cleaning and relatively maintenance free as much as possible and to provide a system which operates with low energy consumption.

More particularly, the revolving downflow injector design described in U.S. Pat. No. 5,593,574 works adequately with shallow filter media beds. The concept of fluidizing only a narrow zone of media at any given time rather than the conventional method of continually fluidizing the entire bed of media enabled a drastic decrease in the energy required for fluidization.

Nevertheless, efforts to scale-up such downflow injector filters with greater tank diameters, (greater than (>) 1 m) and media bed depths, (greater than (>) 1 m), using this design, required significant increases in pump size to provide sufficient energy to fluidize the pellets. Since the low density plastic pelleted media is buoyant, (specific gravity of 0.91–0.93 relative to water), the downward directed jets of filtrate must have sufficient force to counter the buoyancy and flotation of the media in order to fluidize the bed. With increased bed depth, the energy required increased significantly. By increasing the pressure and flow of filtrate, deep beds could be fluidized but at exceedingly high, if not, prohibitive operating costs.

Additionally, the increased turbulence caused by the high energy injection would frequently cause media pellets to wash out of the filter.

Extensive efforts have lead to the development of a new, much superior configuration.

Initially efforts focused on slowing the rotation of the downflow filtrate injector system represented by U.S. Pat. No. 5,593,574. The fluidization of a given zone is not instantaneous and a period of time is required for the jets of filtrate to penetrate and fluidize a given cross section of media. Efforts to improve the system included the use of low speed gear motors to slow and accurately control the speed of rotation to ensure complete fluidization. With larger beds, that is, with media beds greater than 1 meter in diameter, rotational speeds of ¼ rpm and filtrate flows of approximately 600/l/min/m$^2$ of filter bed surface area were required. However, faster rotational speeds tended to result in incomplete fluidization of the media. Further, in order for downward directed jets of filtrate to fluidize the media, the jets had to have sufficient energy to counteract the upward flotation, (buoyance), of the media as well as to counteract the friction in the media bed.

Accordingly, it would be advantageous to provide an injector system to fluidize the media bed which would ensure that all areas of the filter media bed receive as uniform a flow of filtrate as possible and which could be expanded radially or indepth to encompass larger media beds.

The earlier U.S. Pat. Nos. 5,055,186 and 5,593,574 referred to above, utilize plastic media pellets and the system to which this invention is directed also depends on the use of plastic media pellets. The purpose of the media is to provide an optimal 'engineered' surface area for culturing bacteria, fungi and other microorganisms, while at the same time providing the maximum possible effective surface area per unit volume of filter at a reasonable cost. The desired microorganisms require a surface to colonize and with the appropriate nutrients and environment a diverse ecological mix of species establishes and grows to create a biofilm. The biofilm adheres to the substrate—media pellets—and will generally flourish and grow until it plugs the interstitial spaces between the supporting media and blocks the flow of nutrients to the microorganisms. Additionally, particulates in the filtrate also adhere to the "sticky" biofilm through a number of mechanisms and serve to accelerate the plugging of the filter. An effective filter therefore has to continually harvest excess biofilm and particulates in order to maintain an optimal biofilm which is constantly in a growth phase condition, rather than one that cycles between "start-up-growth-plugging-crashing-cleaning-start-up". The fluidized bed design can provide an environment wherein excess biofilm is continually scoured off the media, while sufficient shelter is provided to provide an adequate environment for maintenance of a continually self renewing, optimally, thin biofilm.

Conventional fluidized beds generally utilize randomly configured support media such as sand and plastic material. Creased or grooved media pellets are disclosed in the abovenoted U.S. Patents. Nevertheless, it would be advantageous to have media pellets which have very specific characteristics and which are manufactured to a specific engineered design to optimize film growth and to be compatible with the radial flow injection system developed.

The filter design relies on the buoyancy of the media pellets to maintain the media bed within the filter. Insufficient buoyancy or excessively high filtrate flow rates which result in excess downflow velocities will wash the media out of the filter outlet. Earlier attempts to screen the outlets of the filters proved futile since the biofilm grows rapidly and plugs the screens.

Biofilms for example, have a specific gravity of approximately 1.07 relative to water. The low density plastic pellet has a selected specific gravity in the range of 0.91 to 0.93 so that it floats in water. The media pellet must therefore be designed with sufficient mass so that the ratio of the maximum supportable biofilm mass, to the pellet mass remains less than one or the pellets will sink.

An apparently obvious solution would be to decrease the density of the plastic and increase the buoyancy. A small increase in buoyancy, however leads to drastic increases in the energy required to fluidize the media, especially in the start-up phase when there is no biofilm present to counter the buoyancy of the pellets. Since energy consumption is a critical factor in determining the success of the bioreactor design, significant increases in buoyancy of the media pellets is not a cost effective option.

All characteristics of the pellet must be considered together to achieve a successful design. A balance must be achieved between the cost of materials and manufacturing, the effective surface area for biofilm culture per unit volume of filter and the dimensions of the sheltered grooves which determines the biofilm biomass relative to the mass of plastic per pellet as this relationship determines pellet buoyancy once the biofilm is established. The design of the pellets must be such to minimize interlocking of pellets which increases energy requirements for fluidization. Further, the pellets must be as small as possible to maximize surface area per unit volume while providing adequate mass for buoyancy as described.

Accordingly, it would be advantageous to have pellet media which have proven to be an acceptable compromise between the various design parameters noted above, particularly in fluidized bed systems as set forth herein.

SUMMARY OF THE INVENTION

In order to secure greater uniformity in the fluidization of pellets by filtrate, a new approach was investigated wherein the filtrate would be injected horizontally to fluidize the media, as this would eliminate the buoyancy factor. The design developed provides for orifices in a central, vertical rotating, main manifold directing pumped filtrate in horizontal streams or 'jets' out towards the periphery of the filter bed. Since the main manifold is located in the centre of the cylindrical bed and rotates about the central vertical axis there is virtually no friction to overcome in order to turn it. The central or main manifold rotates slowly enough to permit the jets to horizontally fluidize a vertical zone of media of related narrow arc from the centre extending out to the perimeter of the reactor, a fluidization which is cyclical for the media pellets. With the previous filter design noted in the background of the invention, as the filter depth of the media bed increased, the downward pressure and flow required for each filtrate jet also increased in order to fluidize the media bed. With the new design, the horizontal distance from the central manifold to the periphery is constant with depth and with equal spacing of the orifices or nozzles on the central manifold, each jet from the orifices fluidizes an equivalent sized zone of media. To fluidize deeper media beds for a given filter diameter requires simply extending the length of the central manifold and adding more orifices, each with equivalent flow and pressure. The flow required to fluidize a given diameter of filter bed increases linearly with depth while pressure remains essentially constant with the radial flow design. With the previous downflow design, pressure and flow requirements increased with depth, therefore increasing energy costs for operation.

Further, it was desirable to develop simple mechanisms to rotate the central manifold and control the speed of rotation. Speed control is relatively important in this design since a period of time is required for the horizontal jets to penetrate the media bed and totally fluidize a given zone all the way to the periphery of the bed.

Rotational speed controls developed for some previous downflow designs relied on expensive low speed gear motors and relatively complex mechanical configurations. Given the often corrosive, environments in which the filters operate (often salt water) the costs were significant. Significant maintenance was required and mechanical failures were more frequent than desired. The goal was therefore to develop a simple design which would be inexpensive and dependable.

Accordingly, in the present design, jets of filtrate from the vertical rotating central manifold fluidize an arcuately narrow vertical zone of media pellets in a radial direction from the centre to the periphery of the filter. The pressurized jets of filtrate work their way through the media bed until the pellets in a narrow vertical zone are completely fluidized. Fluidization of the zone of media from the centre to the periphery however requires several seconds.

The viscosity of the media is very low in the fluidized zone relative to the adjacent non-fluidized zone. The injector system of the invention utilizes this viscosity differential and the time lag for fluidization of a given zone, as a basis for rotational speed control.

A second vertically extending manifold, a thrust injector or thrust manifold, is located at the outer perimeter of the filter bed and is preferably connected to the vertical central manifold by horizontal support manifolds which are above and below the media bed. The thrust manifold is offset so that the horizontally directed filtrate jets from the central manifold are directed ahead of it. Orifices are located down the side of the thrust manifold and are oriented horizontally perpendicular to the central manifold orifices, that is, oriented generally in a tangential direction to the bed of media. Thrust created by the pumped filtrate emerging from the thrust manifold orifices pushes the thrust manifold forward into the low viscosity, fluidized zone created by the jets from the central manifold. The central manifold is therefore continually creating a low viscosity zone rotationally in front of the thrust manifold, so very limited thrust is required to move the vertical thrust manifold ahead. The viscosity of the unfluidized bed of media will not allow the thrust manifold to move forward beyond the zone fluidized by the jets from the central manifold. Since the two manifolds are physically connected by the support manifolds and in fluid communication with each other, a positive feedback control is established and the injection system rotational speed is therefore self governed and ensures that the thrust manifold cannot rotate unless complete fluidization of the zone in front of the thrust manifold by the jets from the central manifold is achieved from the centre to the periphery of the bed. With each complete revolution of the manifold through the pelleted media, the entire bed is thoroughly fluidized and the filtrate is uniformly distributed to all biofilm surfaces in the filter media bed.

Filtrate flow rates can be increased substantially if desired and additional thrust manifolds can be added to the central manifold. The distance that a pressurized jet of filtrate can effectively penetrate a bed of media is limited, for example, approximately 0.5 m, before the energy is significantly dissipated. To fluidize wider diameter beds of media, the horizontal support manifolds can be extended by additional support manifolds and additional or secondary vertical injectors or manifolds can be added between the additional support manifolds at intervals, for example, at intervals of approximately 0.5 m. These vertical secondary manifolds are similar in design to the central manifold. However, each of the secondary manifolds is offset from the one immediately inward thereof in order for the filtrate jets of the radially inward manifold to fluidize the arcuate zone in front of the manifold and thus enable it to move forward. Only the radially outermost manifold need be of the thrust manifold configuration since the maximum torque is achieved by providing thrust at the inner periphery of the tank.

The new injector system could also be potentially applied to larger filter bodies of circular or other polygonal shapes. A number of injector units could be supported on a frame above a bed of media and the injectors would each act to fluidize overlapping cells of media. A pipe manifold system would be used to uniformly distribute the filtrate to each of the multiple injector heads.

Further, it will be apparent that the new injector system can be retrofitted to existing bioreactor systems. A manifold structure comprising the central manifold with radially directed openings in association with an offset thrust manifold suitably supported and capable of ejecting filtrate in accordance with the above, can be easily incorporated into an existing bioreactor tank with minimal piping restructuring.

The disclosed method of injecting the filtrate is very efficient and minimizes the flow requirements in comparison with other and conventional fluidization techniques which fluidize the entire bed and require very high flow rates with large pumping rates and energy consumption.

As with the previous bioreactor designs, solids consisting of excess sheared biofilm and fine particulates settle and are flushed daily from the system via a bottom drain valve. This flushing is the only required maintenance for the bioreactor as it is otherwise self-cleaning.

A gear motor driven, vertical injector manifold represents an alternative to the water powered design. This option is a useful alternative for filter applications when filtrate flows and pressures are insufficient to provide adequate thrust to rotate the manifold apparatus. Additionally, as the filter tank diameter increases and the thrust manifold is positioned further from the central manifold, the torque increases for a given flow and pressure of filtrate. With small diameter filters (less than 50 cm.), therefore, in applications with relatively low flows of filtrate, there may be inadequate power to rotate the manifold. In such applications, a simplified motor driven injector manifold design, consisting of the central injection manifold without the thrust manifold and upper and lower support manifolds is a viable solution. Since the central manifold rotates around the center axis of the filter, there is very little friction involved since there is no apparatus actually moving through the viscous filter media. Therefore, a small, very low torque gear motor would be sufficient.

Accordingly, the invention in one broad aspect provides apparatus for use in association with a bioreactor tank having a bed of media pellets to be fluidized and for treating filtrate in the tank through biofilm adhering to the pellets. The apparatus including a vertically elongate central manifold having a plurality of openings longitudinally spaced along its length, the openings in the central manifold being substantially axially aligned and included in a vertical plane extending radially outwardly of the central manifold. The central manifold includes conduit means by which filtrate can be conveyed to and out of the openings. Means is provided for mounting the central manifold for rotation within a bioreactor tank having an inner periphery of wall. Means is also provided for rotating the central manifold at a predetermined speed when the central manifold is mounted in the bioreactor tank. Thus, when the central manifold is in operative association with the tank, filtrate communicated to the manifold openings under pressure is ejected substantially horizontally from the manifold openings in the plane to fluidize pellets cyclically in an arcuately narrow vertical zone extending between the central manifold and the peripheral wall of the tank as the central manifold is rotated.

Another aspect of the invention provides a method of treating filtrate in a bioreactor apparatus having a bed of buoyant media pellets floating within the filtrate to be processed in a tank having a peripheral wall for containing the filtrate and the bed of media pellets. The method includes the steps of providing a rotatably vertically supported central manifold within the tank, the central manifold having a plurality of longitudinally spaced radially directed openings intermediate its ends, providing means for rotation of the central manifold, feeding filtrate to the central manifold and out the openings while rotating the central manifold whereby a plane of filtrate is ejected from the openings to cyclically fluidize an arcuately narrow vertical zone of pellet media outwardly of the central manifold between the central manifold and the peripheral wall of the tank.

More preferably, the apparatus and method include providing a thrust manifold adjacent to the inner peripheral wall of the tank which is connected with and/or fluid communication with the central manifold and is designed with openings through which filtrate is forced but in a tangential direction, to the tank wall, to cause rotation of the central manifold in a self controlled manner.

With respect to the media pellets, applicant has found that pellets having certain physical parameters and optical dimensional ranges are to be preferred for the most efficient operation of the bioreactor herein. A simple configuration of a pellet is preferable, which can be manufactured in a one step, low cost extrusion process, the extruded length with appropriate grooves/ridges being sliced to produce the final pellets. Although pellets fabricated by combinations of other manufacturing processes, such as injection or extrusion, combined with secondary stamping or roll forming of surface configurations, are recognized as possible, designs of pellets which are compatible with one step extrusion are more cost effective to fabricate. Nevertheless, the pellet design is not a random design but is engineered to very specific criteria to be described herein.

Accordingly, a still further aspect of the invention comprehends a media pellet for use with a bioreactor system wherein a plurality of pellets are within a filtrate to be treated. Each pellet has specific gravity of from 0.91 to 0.95 with at least one surface having ridges and grooves, the grooves being approximately 1 mm in width and 1 mm in depth, the ridges being greater than 1 mm in width to prevent interlocking with other like pellets and the pellet has unit weight in the range of 0.05–0.07 gms.

BRIEF DESCRIPTION OF THE DRAWINGS

FIG. 6 is a top view of a second embodiment of the invention showing a manifold structure and ejector system with a secondary manifold.

FIG. 7 is an elevational view, partly in section, of the central manifold support manifolds, secondary manifold and thrust manifold of the embodiment of FIG. 6.

FIG. 8 is a partial sectional view of the manifold of FIG. 7 taken along line 8—8 of FIG. 7.

DESCRIPTION OF THE PREFERRED EMBODIMENTS

Figure 1:
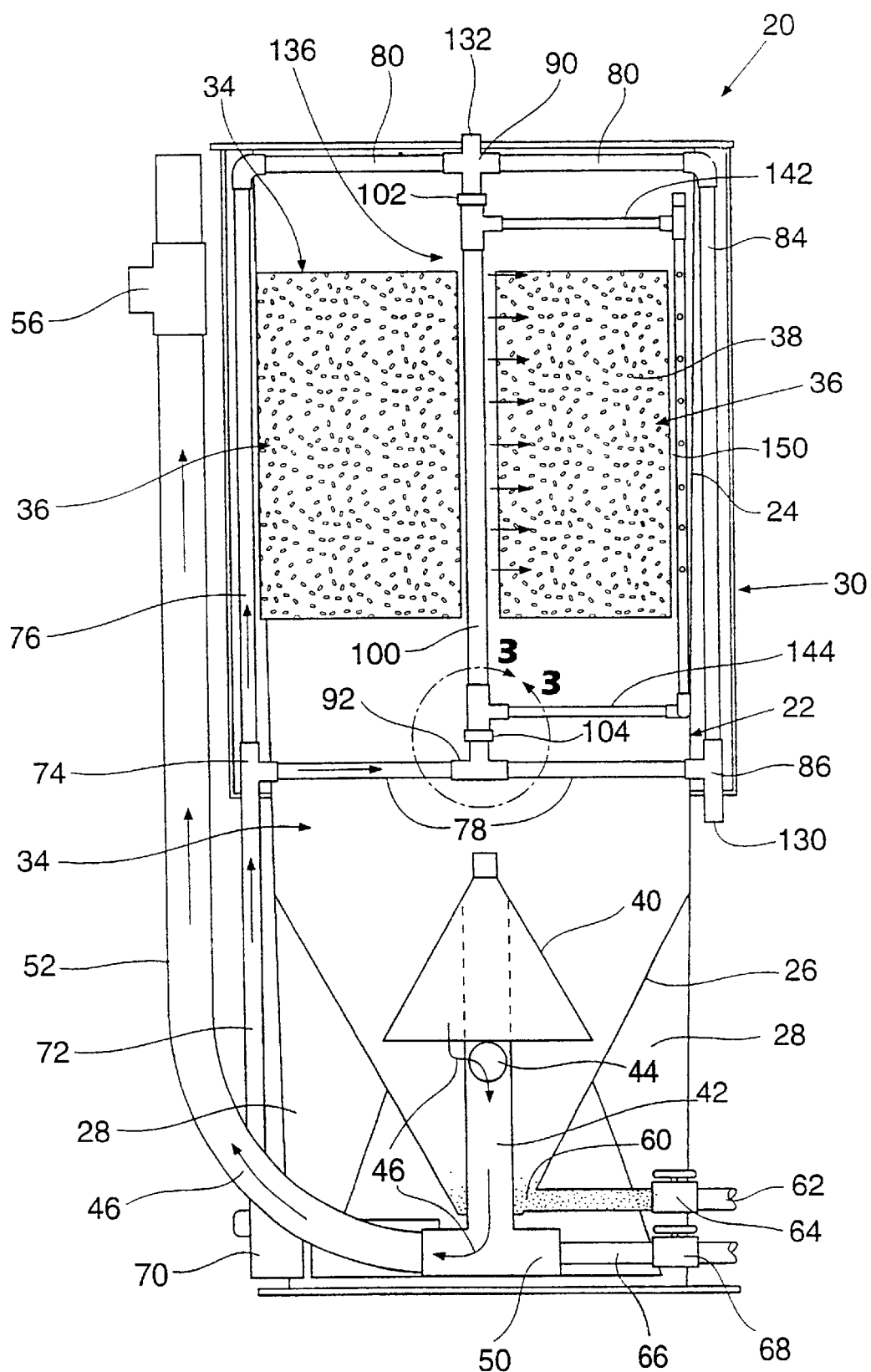
FIG. 1 is an elevational view of a bioreactor according to the invention, with the front wall of the tank removed for the purposes of clarity.

Turning to FIG. 1, a bioreactor 20 is illustrated in elevational view with the front wall of the tank 22 removed. Bioreactor tank 22 has an upper cylindrical portion 24 and a lower conical portion 26. Tank 22 is supported by supports 28, only two being shown. Tank 26 would have other like supports 28, front and back, but they have been omitted for the sake of clarity. Peripherally outwardly of tank 22 is cylindrical housing 30, the spacing between housing 30 and tank 22 being sufficient to accommodate associated piping and conduits to be described further herein. Tank 22 contains filtrate 34 to be filtered and a low density media bed 36 of pellets 38 floating in the upper portion of the filtrate 34.

Cone shaped baffle 40 is supported by filtered effluent manifold 42, which manifold has opening 44, through which filtered or processed effluent may flow. Filtered or processed effluent is removed from the bioreactor 20, through opening 44 and as shown by arrows 46, through conduit junction 50 and outlet conduit 52. Outlet conduit 52 has a level control opening 56 through which filtered or processed effluent can be removed for use elsewhere, for example, filtered water, in an aquaculture system as disclosed in U.S. Pat. No. 5,593,574. However, the bioreactor system is operable with other forms of filtrate than water.

Bottom 60 of conical tank portion 26 concentrates solid waste, which is mainly scoured excess growth from media pellets 38. The solid wastes are periodically removed via conduit 62 and valve 64 in known fashion. Conduit 66 and valve 68 provide means for cleaning and flushing out the tank system.

Inlet pump 70 is located to pump filtrate to be processed in the bioreactor from a source, (not shown), through conduit 72 into a manifold system associated with tank 22.

Conduit 72 extends upwardly from pump 70 and connects at T connector 74 with vertical and horizontal filtrate inlet conduits 76 and 78. Vertical conduit 76 continues upward between tank 22 and housing 32 and is in fluid communication with upper, horizontal conduit 80 which crosses diagonally the top of tank 22 and is in fluid communication with conduit 84 which extends downwardly on the other side of tank 22 inside housing 32 to T connector 86.

Figure 3:
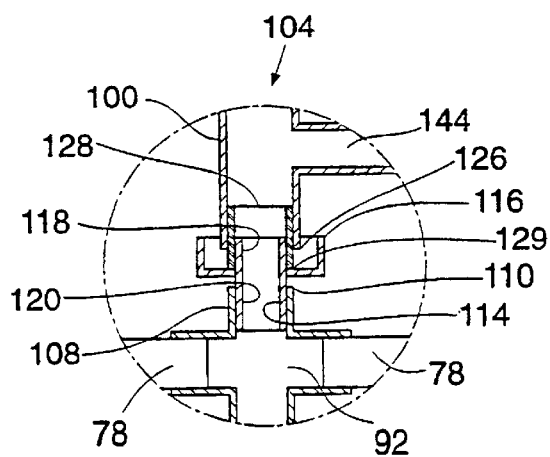
FIG. 3 is an enlarged view of the lower bearing or support system for the central or main manifold of the bioreactor taken around line 3—3 of FIG. 1.

Horizontal filtrate inlet conduit 78 extends diagonally across and within tank 22 and connects with connector 86. It will be appreciated that conduit 78 is sealed with respect to tank 22 where it enters and exits the wall of the tank 22. Upper and lower central manifold connectors 90 and 92 are associated with conduits 78 and 82 and rotatably support central manifold 100 through bushing slip joints 102 and 104. Manifold 100 is along the axis of tank 22. Slip joints 102, 104 are similar and only the bottom joint 104 is shown in detail in FIG. 3. Connector 92 has vertical portion 108 with upper end 110. Liner 114 has splash guard 116 peripherally secured thereto and the liner has portions extending above and below splash guard 116 at 118 and 120 respectively. Lower portion 118 closely fits within section 108 and liner 114 is held in position by guard 116 on the upper end 110 of conduit portion 108. The lower end 126 of central manifold 100 has bushing insert 128 secured thereto, bushing insert 128 being sized to rotate around extension portion 118 and supported at its lower end 129 by the splash plate 116 and capable of rotation about lower portion 118. The slip joint 102 at the top end is essentially the reverse of joint 104 with a slight gap or space, (e.g. from ¼ to ½"), between the top end of the bushing insert and splash plate. Cylindrical portion 130 of connector 86 and cylindrical section 132 of connector 92 are removably plugged to permit flushing or clean out of the manifold, as desired.

Figure 4:
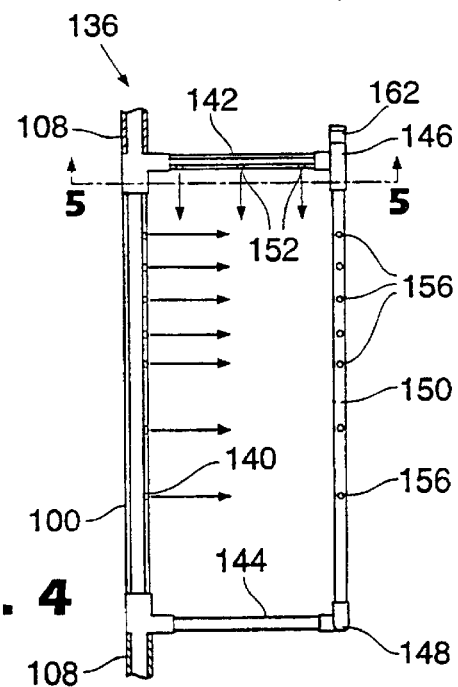
FIG. 4 is an elevational view, partly in section, of the central support and thrust manifold of the embodiment of FIG. 1.

As seen in FIGS. 1 and 4, a manifold structure or system 136 is shown including central manifold 100 having a plurality of openings or nozzles 140 spaced along a substantial portion of its length, which openings or nozzles 140 are directed radially outwardly and aligned in a substantially vertical plane. Extending radially outwardly from manifold 100 are upper support manifold 142 and lower support manifold 144 which connect via connectors 146, 148 with a vertical thrust manifold 150 adjacent the inner periphery of tank 22. Manifold 150 is parallel with central manifold 100. Upper conduit 142 has downward openings or nozzles 152 and thrust manifold 150 has a plurality of horizontally directed openings or nozzles 156.

Figure 2:
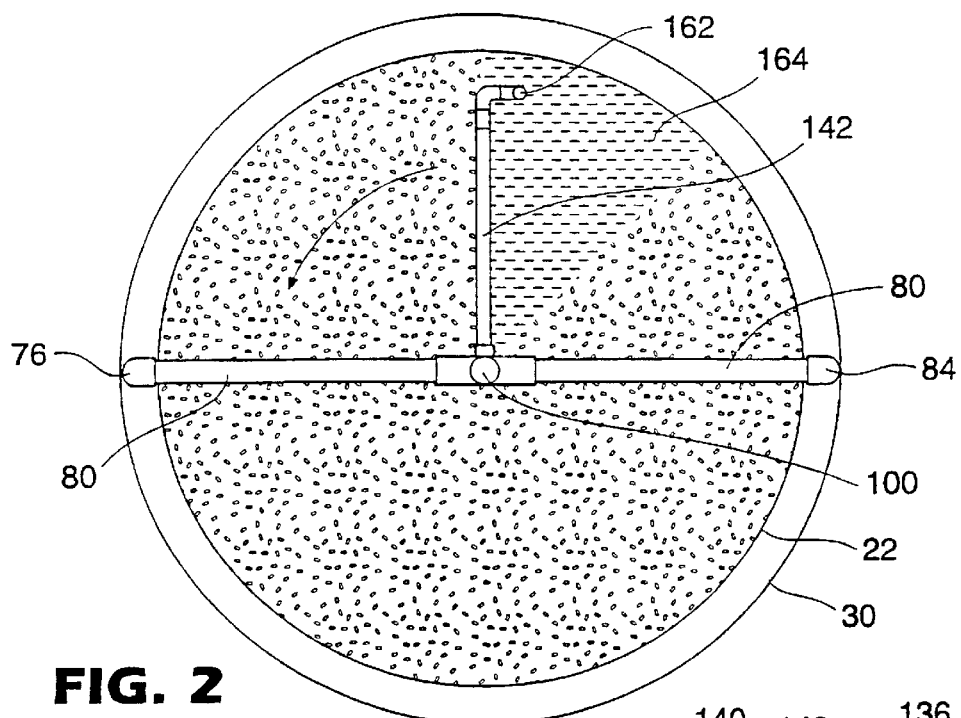
FIG. 2 is a top plan view thereof.
Figure 5:
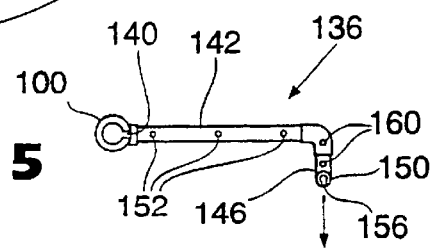
FIG. 5 is a partial sectional view of the manifold of FIG. 4, taken along line 5—5 of FIG. 4.

Turning to FIGS. 2 and 5, it will be apparent that thrust manifold 150 is offset from the plane defined by the central manifold 100 and upper and lower conduits 142, 144. It will also be noted from FIG. 5 that connector 146 also has downwardly directed openings or nozzles 160. Removable cap 162 of connector 146 provides for clean out of the thrust manifold 150. Liquid forced from horizontally directed openings 156 in thrust manifold 150 tends to rotate the filtrate manifold structure 136 comprising of the central manifold 1 00, thrust manifold 150 and upper and lower support manifolds 142, 144 in a counterclockwise direction as seen in FIG. 2. Downwardly directed nozzles 152 and 160 provide additional means for agitating and fluidizing the media bed to permit movement of pellets. Although not shown, upwardly directed nozzles or openings could be incorporated in lower support manifold 144.

Liquid to be processed, filtrate, is pumped by pump 70 into manifold structure 138 through conduits 72, 76, 78 and 80.

Filtrate pumped into central manifold 100 ejects radially outwardly from openings or nozzles 140. Filtrate is also forced via support manifolds 142, 144 to thrust manifold 150 and out openings or nozzles 156. Filtrate is also ejected from nozzles 152 and 160 of upper support manifold 142 and connector 146. As noted in the Summary of the Invention, filtrate ejected from nozzles 140 of central manifold 100 fluidizes pellet media over a zone or sector 164, (FIG. 2), commencing with a radial plane defined by the plane of nozzles 140 and resulting jets of filtrate 138 outwardly from the central manifold 100. Zone 164 rotates as the manifold structure 138 rotates.

The radially outwardly directed filtrate ejected from the central manifold nozzle 140 fluidizes the pellets in front of the thrust manifold thereby allowing it to move easily through the fluidized pellets 38 in front of it.

FIGS. 6–8 illustrate a further embodiment wherein like features to those of FIGS. 1–5 are referred to with an "a" designation. Tank 22a is larger in diameter and there are two portions to the rotatable filtrate manifold structure 166. The manifold structure 166 has a secondary vertical manifold 170 with nozzles 172 projecting horizontally and radially outwardly. Secondary manifold 170 is supported by support manifolds 142a and 144a through upper and lower connectors 174, 176, upper connector 174 having nozzles 178 similar to nozzles 160a. As noted previously, as a tank increases in diameter, horizontal jets of fluid directed by nozzles 140a in the central manifold 100a are not effective in agitating and fluidizing pellets sufficiently in front of the thrust manifold 150a to allow it to move easily through the fluid, so a secondary vertical manifold, such as 170, with radially directed nozzles 172 is used. However, in order to provide suitable fluidization of media in front of secondary vertical manifold 170 to permit it to move through bed 36, the secondary manifold 170 is itself offset from central manifold 100a. As seen in FIGS. 6 and 8, jets from nozzles 172 of the secondary manifold 170 provide fluidization of media in front of thrust manifold 150a which is offset again from the secondary manifold 170. It will be apparent that additional "secondary" manifolds can be incorporated as may be appropriate for larger tanks. Further, if deeper beds are used, additional nozzles or openings in the central, thrust and any secondary manifolds can be provided.

Figure 9:
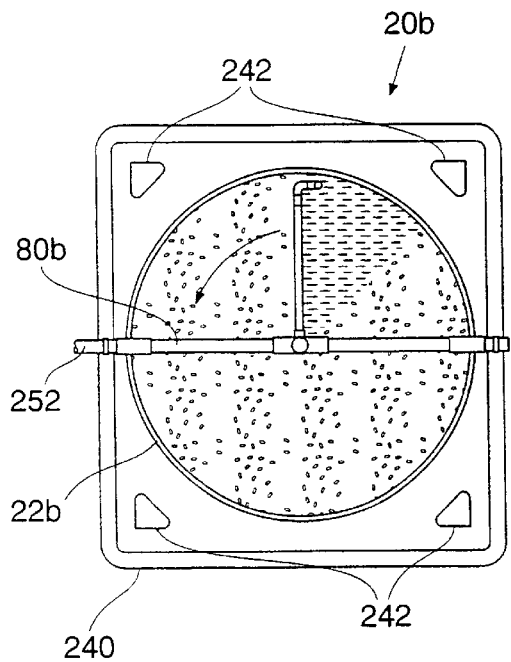
FIG. 9 is a top view of a further embodiment of the bioreactor system wherein the bioreactor is housed within a housing having a light system associated therewith.
Figure 10:
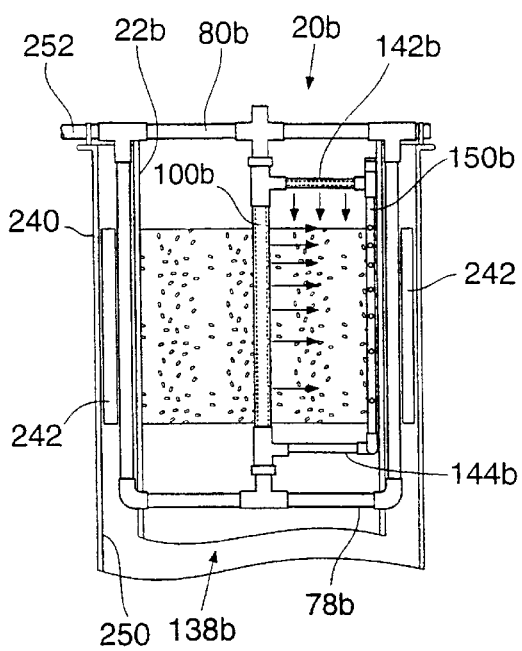
FIG. 10 is an elevational view of the embodiment of FIG. 9.

FIGS. 9 and 10 illustrate a modification of the bioreactor which may be particularly useful when the bioreactor is an algae or the like bioreactor. Similar features to those in FIGS. 1 and 2 have like references with a designation "b".

The main variation of the embodiment of FIGS. 9 and 10 is that the inner tank wall 22b is light, transparent or translucent and surrounded by a generally rectangular outer housing 240. Located within the space between tank 22b and housing 240 and adjacent the corners thereof, are lights 242 which provide light to promote the growth of algae microorganisms in bioreactor 20b. Inside wall 250 of housing 240 is reflective to disperse light over the wall of tank 22b.

It will be noted from FIGS. 9 and 10 that the bioreactor 20b has filtrate inlet or conduit 252 supported from above by the walls of housing 240 and tank 22b. Manifold structure 138b is in effect hung from conduit 80b with added support from the walls of tank 22b where lower conduit 78b passes through the walls of tank 22b.

Figure 11:
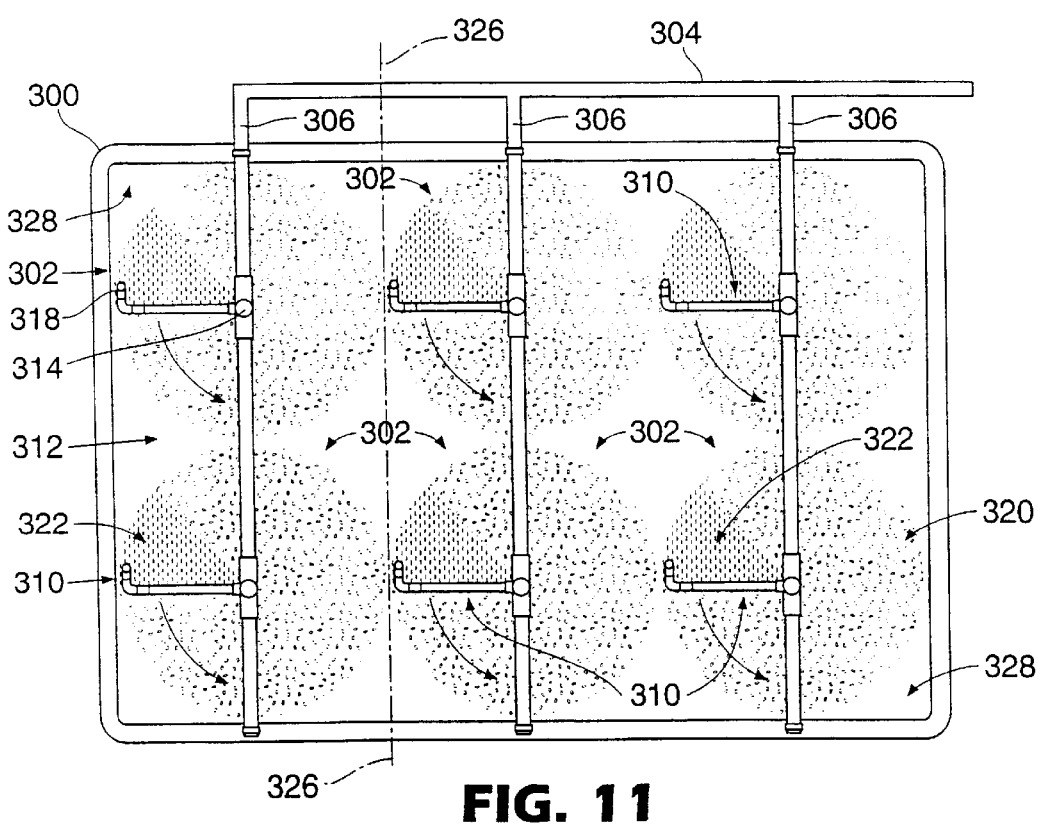
FIG. 11 is a top view of a larger tank of a bioreactor system with a plurality of manifold fluidizing ejector systems.

FIG. 11 illustrates in plan view a large tank or container 300 with a plurality of manifold systems 302 connected together. Inlet conduit 304 connects with three conduits 306 which cross the upper portion of tank 300, each conduit 306 being associated with two bioreactor manifold structures 310. Lower support conduits, (not shown), but similar to conduit 78b in FIG. 10 are below conduits 304.

Although conduits 306 are capable of supporting manifold structures 310, it will be apparent to those skilled in the art that separate support means within tank or container 300 can be used to support manifold structures 310. Each manifold structure 310 comprises a central main manifold 314 rotatably supported from conduit 306, a lower support conduit, (not shown) and thrust manifold 318, for rotation within the media bed 312.

The manifold system 302 are shown laterally separated or spaced for the purposes of clarity in illustration. Tank 300 contains a large bed of media pellets 312 but only the pellets within each sweep 320 of manifold 310 and within the fluidized sector 322 are shown.

In an actual embodiment of the system shown in FIG. 11, conduits 306 would be closer together to provide overlap of sweeps of manifold system 310. This will be apparent if the middle conduit 306 was moved leftward in FIG. 11 toward dotted line 326. Further, the force of the jets of filtrate from the manifolds have been found to actually extend further radially than schematically illustrated in FIG. 11 so that in practice, pellet media in corners 328 of tank 300 are effectively agitated.

Accordingly, conduit 306 need not be spaced together as close as dotted line 326 may suggest in order to agitate all the media pellets 312 in tank 300.

By way of illustration, in a 0.5 meter radius tank, applicant has found extremely effective, fluidization of pellets and bioreactor performance with a central manifold of approximately 2 inches, (5 cm), in diameter with frame and inlet conduits approximately 1½ inches, (3.8 cm) in diameter and support and thrust manifolds of about 1 inch, (2.5 cm) in diameter. The openings or nozzles are in the range of about ⅜–½ inch range in diameter.

Turning now to the pellet media, the configuration of the filter media pellets having been refined and narrowly defined set of criteria for efficient operation of the bioreactor has been found.

Figure 12:
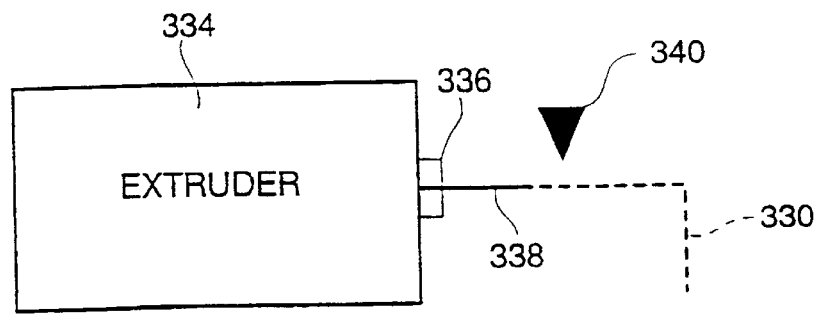
FIG. 12 is a schematic view of the manufacture of pellet media.
Figure 13A:
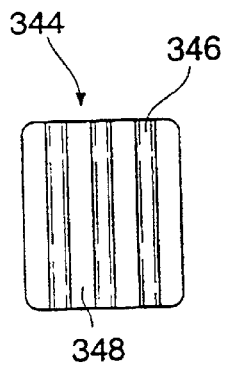
FIGS. 13 and 14 are plan elevational views of shapes of preferred pellet media manufactured to specified criteria.
Figure 14A:
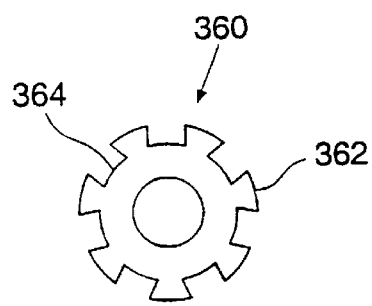
Figure 13B:
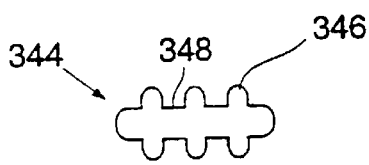
Figure 14B:
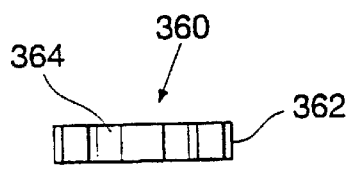

Turning to FIGS. 12–14, these FIGURES relate to pellet media 38 and its manufacture which applicant has particularly found effective in bioreactors of the present design.

FIG. 12 schematically illustrates an extruder 334 with die 336 for extruding plastic material 338 with slicer 340 positioned such that the elongated extruded material 338 may be sliced into pellets 330. Profiles of extruded material 338 and pellets 344, 350 are shown in FIGS. 13 and 14, each figure comprising a and b figures showing the pellets in plan view and elevational view respectively.

FIG. 13 shows a generally rectangular pellet 344 with ridges 346 and grooves 348 on both sides.

FIG. 14 shows generally circular hollow pellet 360 having outer ridges 362 and grooves 364.

The physical parameters and optimal dimensional ranges for the pellets include:

Specific Gravity—0.91–0.95 relative to water
Size—(for disc shaped pellets) diameter 5–7 mm's
   for rectangular pellets Width—Length, 5–7 mm's×5–7 mm's
   Thickness in both cases 3–4 mm's
Grooves—Width 1 mm
   Depth 1 mm
Ridges—Width>1.0 mm, preferably<than 1.25 mm's
Unit Pellet Weight—minimum range 0.05–0.07 gm's
Unit Pellet Volume—minimum range—0.055–0.077 ml's
Surface area per unit volume of media—1750 $m^2/m^3$
Shape—A variety of shapes are possible which will maximize sheltered surface area per media pellet within the constraints of the above parameters. Simple configurations such as those shown in FIGS. 13 and 14 are preferable as they can be manufactured in a one step, low cost extrusion process.

It must also be recognized that a biofilm in a real world filter does not consist of a monoculture of one type of bacteria. It is instead an incredibly diverse eco-system including a wide range of microorganisms including bacterial, fungi, multicellular organisms and other algae, which all interact in metabolizing the waste stream and in consuming one another.

Applicant's bioreactor and the media developed are designed for culture of a wide range of microorganisms including algae which require a supporting surface and shelter.

The filter and media are not limited to bacterial cultures so that the size and configuration of the shelters, (media pellets), is critical to support these diverse microorganisms.

Figure 15:
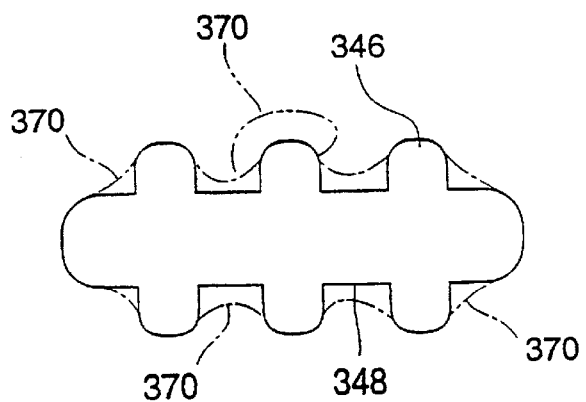
FIG. 15 is a partial sectional view of the pellet of FIG. 13 along lines 15—15 showing the formation of biofilm.

Applicant has found that the relatively range grooves—approximately 1.0 mm×1.0 mm are optimal for sheltering a wide range of microorganisms. FIG. 15 illustrates pellets 344 with biofilm 370 with a groove.

Figure 16:
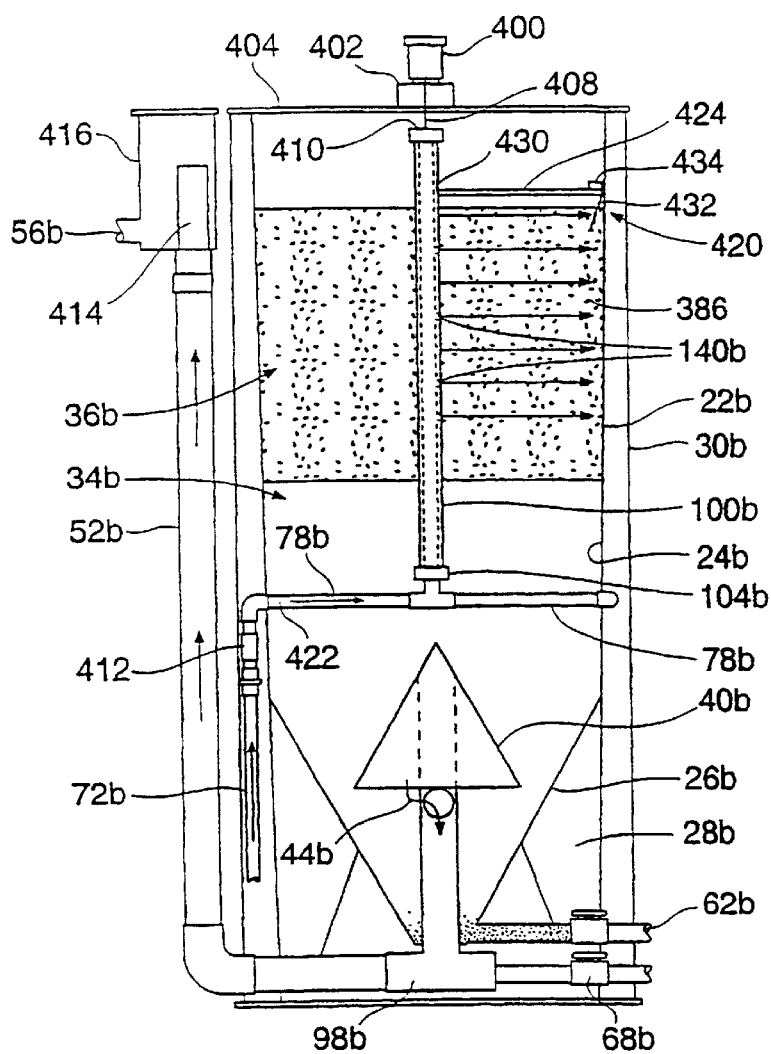
FIG. 16 is an elevational view of a bioreactor according to an alternative embodiment of the invention, with the front wall of the tank removed for the purposes of clarity, mainly the manifold being driven by a gear motor.

Applicant has found that with grooves approximately 1.0 mm in width and approximately 1.0 mm wide, biofilm develops to about 300 $\mu$ (microns) or 0.3 mm in depth which has been found optimal to provide growth of the various and diverse microorganisms. The width of the ridges, as noted above in the specified criteria, are wider than 1 mm but preferably less than 1.25 mm to avoid interlocking of the pellets together which could defeat the effectiveness of the agitation of the pellets and scouring of excess biofilm. It will be appreciated that the general rectangular configuration of the grooves provides for good adhesion and growth of biofilm. The configuration of the grooves in the embodiment of FIG. 16 illustrates that the ridges are slightly wider than the grooves by the nature of the grooves being generally rectangular in configuration.

The pellet design is not a random design as in other patents but is engineered to very specific criteria as described.

The original maximum depth for a biofilm to allow diffusion of nutrients and oxygen is about 300 $\mu$(microns). The grooves of the pellets therefore are designed with a cross sectional area which allows development, shelter and maintenance of an optimal biofilm thickness.

With a groove of less than 1 mm×1 mm, the scouring action of the fluidization process will remove excessive amounts of biofilm. This design provides an optimal habitat for growth of microorganisms in a fluidized bed environment and therefore provides the maximum amount of biological activity per unit volume of filter media.

A randomly manufactured media cannot support as much biofilm and most of the surface of a randomly structured media would not be able to provide shelter to the microorganisms.

In operation of the biofilter, which will have been clear from the above description and FIGS. 1–11, the manifold assembly or system provides for good, controlled fluidization of the pellet media. This is particularly so under the effective feedback control in the preferred embodiment with a thrust manifold by the nature of the pellets in front of the thrust manifold being fluidized by jets from the main or central manifold. It will be apparent that provided the thrust manifold is mounted for controlled rotation with the central manifold whereby the jets of filtrate from the central manifold and/or from any secondary manifolds fluidize pellets in front of the thrust manifold (and/or secondary manifolds), the manifold structure including the thrust manifold is self regulating as to movement and speed. Accordingly, it will be apparent that any form of support for cooperative rotation of the central and thrust manifolds is an obvious modification of the invention provided filtrate fluid is fed to the thrust manifold to cause rotation of the manifold structure. Further, although the preferred embodiment of the apparatus is that shown in FIGS. 1 through 10, it will be appreciated that manifolds, such as 150 and any conduits supporting it and/or the purpose of conducting water to a means whereby water can be jetted in a direction to cause and control rotation of manifold 100 and the vertical plane of water being forced from the manifold is contemplated. Nevertheless, the preferred embodiment is with support means which also act as manifolds for delivering fluid filtrate to the thrust manifold, whether the support manifolds have nozzles or not.

Figure 18:
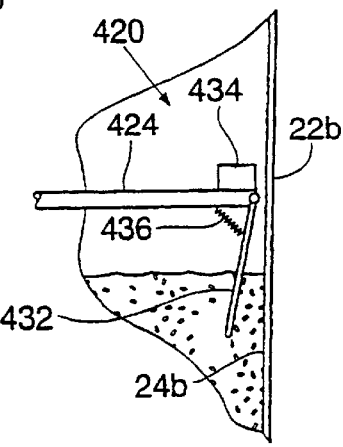
FIG. 18 is an enlarged schematic view of a motor switch control associated with the embodiment of FIGS. 16 and 17.
Figure 17:
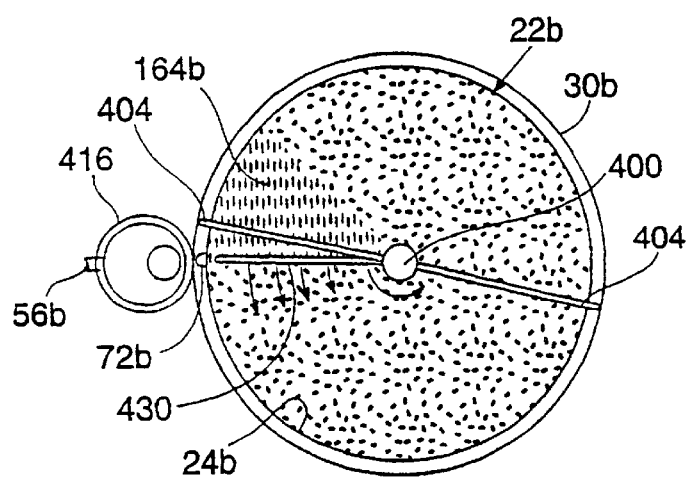
FIG. 17 is a schematic top plan view of the bioreactor of FIG. 16.

Turning to FIGS. 16, 17 and 18 where a gear motor driven, vertical injector manifold is shown as an alternative to the water powered design of FIGS. 1–10, structure in FIGS. 16, 17 and 18 which is comparable to that shown in FIGS. 1 and 2 have been similarly referenced as in FIGS. 1 and 2 but with a "b". Low speed gear motor 400 is vertically mounted at 402 through supports 404 about tank 22b and is directly coupled to drive shaft 408. Drive shaft 408 is in turn connected directly to top 410 of rotating central or main manifold 100b and rotates central manifold 100b at an appropriate and selected speed. A slip joint 104b at the bottom of the rotating central manifold 100b, as in the previously described primary filter design, (FIG. 3), connects the central manifold 100b to the fixed supporting horizontal conduit 78b which is in fluid communication with filtrate inlet conduit 72b including check valve 412. Outlet conduit 52b is connected to an adjustable level control device 414 including outlet chamber or well 416 from which outlet 56b extends.

In this embodiment, the filtrate from openings or jets 140b of central manifold 100b should fluidize the filter media all the way to the periphery of the filter media bed and tank wall 24b in order to uniformly distribute the filtrate 34b throughout the media bed 36b. In the primary water powered configuration of FIGS. 1–10 previously described, the thrust manifold 150 is designed so that it cannot advance until the filtrate jets from the central manifold 100 have fluidized the zone 164 in front of it. It provides a simple feedback control of the rotation speed which ensures that the entire filter bed is fluidized.

With a simple gear motor design of FIGS. 16 and 17, there is no feedback mechanism to ensure that the filtrate jets from openings 140b have adequate time to penetrate the media bed 36b. Thus, if the manifold 416 rotated too quickly, the jets would not have adequate time to fluidize the media all the way to the periphery and the outer zone of media would be ineffective. Through experimentation, the gear motor 400 can be matched to a given filter configuration to provide the appropriate rotational speed with good fluidization of pellet media from manifold 100b to tank wall 24b. Although more costly, a variable speed gear motor (not shown) with a controller can be used to enable fine tuning of the speed for a given application.

Further, it is also possible to incorporate a mechanical or optical sensor which would determine that the filtrate jets had penetrated to the periphery and would in turn control the gear motor 400. By way of example, mechanical sensor 420 is supported on an arm 424 located above media bed 36b, which is attached to central manifold 100b at 430 and is aligned with the filtrate jets from openings 140b. Arm 424 rotates with the manifold 100b. Arm 424 carries at its outer end, a small spring loaded flap or wand 432 attached to control switch 434 (FIG. 18). Wand 432 extends into the media bed at the periphery of the bed. The pressure of the filtrate jets forces wand 432 outward against the force of spring 436 to close switch 434 and activates an electrical circuit, (not shown), including motor 400. Motor 400 then rotates manifold 100b slightly and shuts off until the filtrate jets again penetrated the media all the way to the periphery 24b at the rotated position and again closes the circuit by actuating the wand 432 and contact switch 434. Circuitry between the switch and motor is not shown as appropriate circuitry will be apparent to persons skilled in the art.

In an alternative to the above, a light sensing device, (not shown), can be used. In this embodiment, a small light source and sensor are mounted on the outer end of a support arm 430 instead of the mechanical sensor. The light sensor would detect the difference in light intensity reflected from the surface of the fluidized zone compared to an unfluidized zone. The sensor would in turn activate a switch to control the gear motor through appropriate circuitry, not shown. Further, other speed control devices of similar concept can be used to control the gear motor.

Other modifications to the invention will be apparent to those skilled in the art which fall within the scope of the invention as defined in the appended claims.

What is claimed is:

1. Apparatus for use in association with a bioreactor tank (22, 22*b*) having a bed (36, 36*b*) of media pellets to be fluidized and for treating filtrate (34, 34*b*) in said tank through biofilm adhering to said pellets (38) said apparatus comprising:

a vertically elongate central manifold (100, 100*b*) having a plurality of openings (140, 140*b*) longitudinally spaced along its length, said openings (140*b*) In said central manifold being substantially axially aligned and included in a vertical plane extending radially outwardly of said central manifold (100, 100*b*), said central manifold including conduit means by which filtrate can be conveyed to and out of said openings (140, 140*b*);

means for mounting said central manifold for rotation within a bioreactor tank having an inner peripheral wall (24*b*); and means (150, 400) for rotating said central manifold at a predetermined speed, when said central manifold is mounted in said bioreactor tank;

wherein, when said central manifold is in operative association with said tank, filtrate communicated to said manifold openings (140, 140*b*) under pressure is ejected substantially horizontally from said manifold openings (140, 140*b*) in said plane to fluidize pellets cyclically in an arcuately narrow vertical zone (164, 164*b*) extending between said central manifold (100, 100*b*) and the peripheral wall (24, 24*b*) of said tank as said central manifold is rotated.

2. The apparatus of claim 1 wherein said means (400) for rotating said central manifold comprises motor means and further including means (420) for controlling operation of said motor and rotation of said central manifold as a result of fluidization of pellets being detected at the peripheral wall of said tank.

3. The apparatus of claim 1 wherein said means for rotating said central manifold comprises an elongate thrust manifold (150) having a plurality of openings (156) along its length, said openings (156) in said thrust manifold (150) being substantially aligned and in a longitudinal plane extending radially outwardly of said thrust manifold (150);

means (142, 144) for supporting said thrust manifold (150) in association with said central manifold (100) such that the plane of openings (156) in said thrust manifold (150) is substantially perpendicular to the plane of openings (140) in said first manifold (100);

said supporting means (142, 144) also supporting said thrust manifold (150) rearward of the plane of openings (140) of said first manifold (100) in the direction of said thrust manifold openings (156);

said means for mounting said central manifold including means (102, 104) associated with said central manifold (100) for mounting said central manifold for rotation within a bioreactor tank (22) and means (70, 72, 78, 80) for communicating filtrate to be treated under pressure including said means by which filtrate is conveyed to said central manifold opening and to said thrust manifold (150), whereby filtrate ejected from said first manifold openings (140) fluidize pellets adjacent said thrust manifold (150) such that said manifolds (100, 150) are caused to rotate by filtrate ejected from said thrust manifold openings (150).

4. The apparatus of claim 3 wherein said supporting means (142, 144) comprises upper (142) and lower (144) support members, said support members both being substantially in the plane defined by said first manifold openings (150).

5. The apparatus of claim 4 wherein at least the upper support member (142) is a support manifold between and in fluid flow communication with said first manifold (100) and said thrust manifold (150).

6. The bioreactor apparatus of claim 5 wherein said lower support member (144) is also a support manifold between and in fluid flow communication with said first manifold (100) and said thrust manifold (150).

7. The bioreactor apparatus of claim 6 wherein at least one of said upper (142) and lower (144) support members has openings (152) intermediate its length, which openings are directed in the direction of the other of the support members.

8. Bioreactor apparatus (20) comprising the apparatus of claim 1 in combination with a tank (22) having a peripheral wall (24) for containing filtrate (34) and a bed (36) of media pellets;

said central manifold (100) being mounted for rotation about a vertical axis and having a plurality of longitudinally spaced openings (140) intermediate its ends (126), said openings (140) adapted to eject filtrate (36) in a generally horizontal direction and along a substantially vertical plane toward the wall (24) of said tank (22);

a thrust manifold (150) generally parallel to the axis of said central manifold (100) and having a plurality of longitudinally spaced openings (156) intermediate its ends directed horizontally and generally perpendicularly to said plane;

means (142, 144) for supporting said thrust manifold (100) inwardly adjacent said tank wall (124) and offset rearwardly of said plane to rotate with said central manifold (100):

means (70, 76, 78, 80, 142, 144) for feeding filtrate to said central manifold (100) and said thrust manifold (50), whereby said plane of filtrate ejected by said central manifold (100) fluidizes a vertical zone of pellet media around and in front of said thrust manifold (150) and rotation of said central manifold (100) and thrust manifold (150) is caused by filtrate ejected from the openings (156) in the thrust manifold (150).

9. The bioreactor apparatus of claim 8 wherein said supporting means comprise support means (142, 144) extending radially outwardly of said central manifold (100), external of said media bed (36).

10. The bioreactor apparatus of claim 9 wherein said support means comprises upper (142) and lower (144) support members, said support members both being substantially in the plane defined by filtrate ejected from the openings (140) in said central manifold (100).

11. The bioreactor apparatus of claim 10 wherein at least the upper (142) support member is a support manifold between and in fluid flow communication with said central manifold (100) and said thrust manifold (150).

12. The bioreactor apparatus of claim 11 wherein said lower (144) support member is also a support manifold between and in fluid flow communication with said central manifold and thrust manifold and at least one (142) of said support manifolds has openings (152) for directing filtrate toward the media bed.

13. The bioreactor apparatus of claim 8 wherein said bioreactor tank (22) is transparent or translucent and further comprises housing means (240) surrounding said tank (22) and light means (242) being mounted between said tank (22) and said housing means (240).

14. The apparatus of claim 8 wherein the bed (36) of media pellets comprise plastic pellets wherein:

each pellet (38) has specific gravity of from 0.91 to 0.95 with at least one surface having ridges (346) and grooves (348), the grooves (348) being approximately 1 mm in width and 1 mm in depth, the ridges (346) being greater than 1 mm in width to prevent interlocking with other like pellets and the pellets having unit weight of 0.05–0.07 gms.

15. The apparatus of claim 14 wherein said pellets (38) are generally circular in shape and configuration with said ridges (362) and grooves (364) being on the periphery thereof.

16. The apparatus of claim 14 wherein said pellets (38) are generally rectangular in configuration with said ridges (346) and grooves (348) on at least one of said top and bottom surfaces and with a ridge on at least one of said side edges.

* * * * *